March 29, 1927.  W. E. SPRINGFIELD ET AL  1,622,549
TIRE RIM EXPANDING AND COLLAPSING DEVICE
Filed Feb. 1, 1926
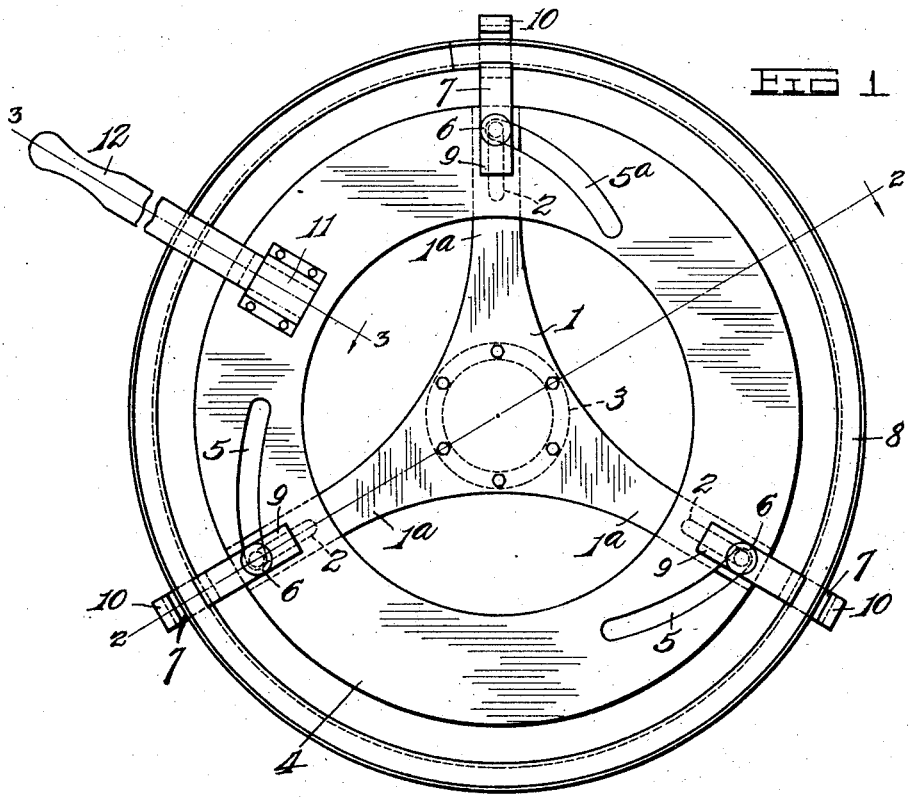
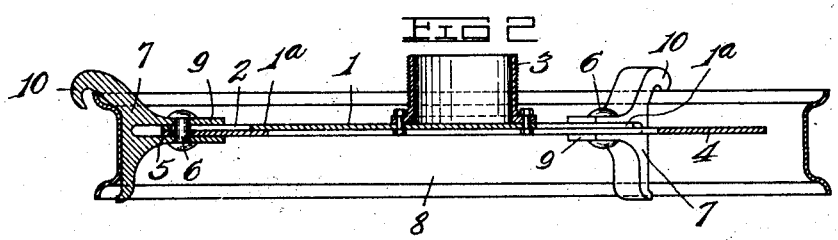
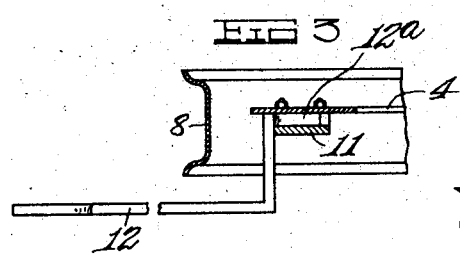
INVENTORS
William E. Springfield.
Bailie W. Frazier.
BY
N. E. Dunlap
ATTORNEY Patented Mar. 29, 1927.

1,622,549

UNITED STATES PATENT OFFICE.

WILLIAM E. SPRINGFIELD, OF MARTINS FERRY, OHIO, AND BAILIE W. FRAZIER, OF WHEELING, WEST VIRGINIA, ASSIGNORS OF ONE-THIRD TO J. W. SCHULTZE, OF WHEELING, WEST VIRGINIA.

TIRE-RIM EXPANDING AND COLLAPSING DEVICE.

Application filed February 1, 1926. Serial No. 85,131.

This invention relates to tire-rim collapsing and expanding devices, and it has for its primary object to provide a simple and practical apparatus by means of which a tire rim may be readily collapsed to permit removal of a pneumatic tire mounted thereon and as readily expanded into seating relation to a tire disposed in encircling relation thereto.

A further object is to provide a device of the character referred to which may be conveniently mounted either upon an automobile as a tire carrier or in a tire-repair shop in readiness for use as occasion requires.

In describing the invention in detail, reference is herein had to the accompanying drawings, in which—

Figure 1 is a side elevation of the invention, showing a tire rim mounted thereon;

Figure 2 is a section on line 2—2, Fig. 1; and—

Figure 3 is a detail section on line 3—3, Fig. 1.

Referring to said drawings, 1 indicates generally a metallic member of spider form, in each of the radially related arms of which, herein shown as three in number, adjacent to the outer ends of the arms is provided a longitudinal slot 2. Said spider is designed to be rigidly mounted for use in any appropriate location, as upon the rear portion of the body of an automobile, where it may be employed in the manner of a tire carrier, or upon any convenient support in a garage or tire-repair shop, one or more suitably attaching brackets being carried by said spider. As herein shown, a single bracket 3 of tubular form adapted to be screwed to a stationary position within a hub-like portion of a carrier or other support is carried centrally by the spider.

Mounted for rotary movements against the outer faces of the arms 1ᵃ of the spider is a flat sheet-metal member 4, herein shown as of ring form, having therein at appropriately spaced intervals cam-slots 5 and 5ᵃ which correspond in number and in spacing with the radial slots 2 of the spider arms 1ᵃ and which are inclined relative to the axis of rotation of said ring. Directed through registering, or relatively intersecting, portions of the various slots 2 and 5 are pins or rivets 6 that are rigidly carried by the stem portions of members 7 which constitute seats for the reception of a tire-rim 8 of the usual split collapsible form.

Each of the rim seats 7 comprises a stem portion 9 and a body portion. The outer, or seating, face of said body portion has a contour which substantially corresponds with the cross sectional internal contour of the tire rim to be received thereon, as shown in Fig. 2. Overhanging the rear portion of said outer face of the rim seat is an integral upstanding hook 10 designed for a purpose which will hereinafter be made apparent.

The stem portion 9 is bifurcated and has received within the bifurcation thereof both the end portion of an arm 1ᵃ of the spider and a contiguous portion of the rotary ring 4.

A keeper-like bracket 11 adapted for the snug reception of an end 12ᵃ of an operating lever 12 is fixed upon a face of the ring 4, as shown.

In practice, when a tire rim 8 is to be collapsed to effect ready removal therefrom of the thereby carried tire, such rim is slipped to a seated position upon the various rim seats 7 of the structure which constitutes the present invention, the parts of said structure then occupying substantially the relative positions shown in Figs. 1 and 2 of the drawings. Then, upon application of downwardly directed force to the lever 12, the ring 4 is rotated for effecting relative contraction of the various rim seats 7, the pins 6 being forced inward along the radial slots 2 of the spider arms under the pressure exerted thereon by the rotating ring at the outer sides or edges of the curved cam slots 5. At the beginning of the inward movement of each rim seat, the hook 10 thereof engages the rear annular edge or flange of the tire rim and, consequently, a contracting or collapsing force is applied to said rim. In this connection, it is to be noted that one of the abutting ends of the split tire-rim must be initially, or perliminarily broken down to a level inward of the other end in order to remove interference to contraction of the rim. To provide for such preliminary breaking down, the rim end which is to be moved in advance of the other is seated upon one of the rim seats 7 which is disposed to travel inward more rapidly than are the others of said rim seats, being associated with the ring slot 5ᵃ which is inclined at a more acute angle to the therewith associated radial slot 2 than are the slots 5.

When a tire is to be fitted upon a rim, the latter is contracted in the manner hereinbefore described and, following the mounting of the tire thereupon, is reexpanded to its normal condition in close fitting relation to the tire by reversal of the direction of rotary movement imparted to the ring 4 under force applied to the latter through the operating lever.

What is claimed is—

A tire-rim contracting and expanding device comprising a fixed member having therein radial slots, a member adapted for rotary movements with respect to said fixed member and having therein slots inclined with respect to the axis of its rotation and crossing the slots of said fixed member, one of said inclined slots being inclined at a steeper angle than the others thereof, rim seats having attaching means directed through registering portions of the slots of said fixed and rotary members, said means being movable inwardly and outwardly along the slots of said fixed member for relatively contracting and expanding said seats, and an inwardly facing hook carried by each of said seats engageable with an outer peripheral portion of a tire rim mounted on said seats.

In testimony whereof we affix our signatures.

WILLIAM E. SPRINGFIELD.
BAILIE W. FRAZIER.